Patented June 19, 1934

1,963,896

UNITED STATES PATENT OFFICE 1,963,896

TREATED PIGMENT

Henry A. Gardner, Washington, D. C.

No Drawing. Application May 21, 1932,
Serial No. 612,869

4 Claims. (Cl. 134—58)

This invention relates to methods of treating pigments whereby to improve the characteristics thereof and/or to confer upon the same new characteristics: the invention relates also to pigments so treated.

An object of the present invention is the provision of pigments, particularly of finely divided pigments, in such form that little or no dusting of the pigments occurs in the handling of the same. Another object of invention is the provision of pigments in a more compact form than ordinarily encountered. A further object is the provision of pigments which wet readily in oils or rubber and which exhibit a markedly low oil absorption in the preparation of pigment-oil paints. Other objects of invention include the provision of pigments which when ground in oil to make paints show no, or greatly delayed, "livering".

To overcome inherent difficulties in the use of pigments in the paint, rubber and other industries, it heretofore has been proposed to mix the pigments with various wetting agents, or to spray the pigments with mists of such agents, or to treat the pigments with vapors or "fumes" of such agents, in an effort to improve their wetting properties. Such mixing, spraying or fuming does not, however, appear to accomplish material improvement of pigments from the standpoints of "livering" or of compatability with certain film-forming compositions such for instance as glycerin phthalate liquid. This deficiency of the merely "wetted" pigments I have found is attributable to the fact that mere mixing, spraying or fuming of the pigment with the wetting agent cannot effect the displacement of the films of gas (e. g., air) normally adhering to the facets of the pigment particles, and that adhering gas film must first be removed from the surfaces of the particles before the latter can be adequately filmed with the wetting agent.

The method of the present invention, then, consists essentially in treating the pigment with a relatively small amount of a wetting agent such for instance as pine oil, a terpene-sulphur reaction product or the like, as by spraying, mixing or, preferably, fuming the pigment with the agent in liquid form, and then compressing the so-treated pigment, under great pressure, whereby to effect displacement of gas films by the liquid or liquefied wetting agent. Advantageously, the treated pigment before compressing may be stoved, as by heating in a closed container, for a short time at a temperature selected with regard to the boiling point, or subliming point, of the agent, whereby to effect a more uniform dispersion of the agent about or between the pigment particles. The amount of wetting agent used may in certain instances be equivalent to about 10% by weight of the pigment treated, but often may be used in an amount not in excess of about 1% by weight thereof in order to attain the desirable results hereinbefore and hereinafter mentioned. By the expression "great pressure" I mean pressures up to 10 or more tons per square inch.

The resulting product is a relatively coherent compressed mass of pigment particles from the surfaces of the individual particles of which the gas film has been replaced by the wetting agent in the form of an adhering film of at least "monomolecular" thickness. The compressing of the wetted pigment greatly reduces the bulk of the pigment, so that thereby the pigment is caused to occupy only about one-fourth or one-fifth the space it ordinarily would occupy. This great reduction of bulk makes possible material economy in cost of transportation and storage of pigments. The compressed mass, which may, obviously, be in the form of a tablet or cube or other suitable shape, has been found to crumble or disintegrate readily and practically instantly in a mill where it is to be used in the preparation of paint, rubber mixes, plastics and like compositions. Incorporation of the compressed pigment into rubber, paint or enamel or lacquer base, or plastic base is effected without any dusting of the pigment, thereby avoiding the annoyance and, in many cases, positive hazard of having dust floating in the workroom, to be absorbed by the workmen.

Surprising results are effected by reason of this treatment of pigments. Thus, in the case of red lead, it makes possible the incorporation of that pigment into varnishes, e. g., acidic varnishes, with no or immaterial reaction between the pigment and the acidic constituents of the varnish and consequently no or only immaterial hardening of the resulting composition. In the case of zinc oxide, it makes possible the incorporation of that pigment into glycerine phthalate compositions with little or no stiffening or hardening of the resulting composition. This is all the more surprising since heretofore it had been held impossible to employ zinc oxide in any material amount with such resin compositions due to the extreme reactivity of zinc oxide with the resin.

Illustrating the effect that wetting and compressing zinc oxide has, with respect to its availability as a component of glycerin phthalate-containing coating compositions, I prepared three samples of composition using in each case identical quantities of pine oil treated zinc oxide and of glycerin phthalate liquid: sample A, the zinc oxide was untreated; sample B used oxide which had been sprayed with 5% pine oil, sample C used oxide which had been fumed with 5% pine oil, while the oxide in sample D had been fumed with 5% pine oil and then compressed at more than ten tons per square inch. Sample A "livered" in one day, samples B and C "livered" in four days, whereas sample D evidenced no "livering", and was in a good, usable condition at the end of a twenty day period.

The invention will be described in further detail by reference to the following illustrative examples:

Experiment 1

200 grams of zinc oxide was ground with 400 grams of glycerin phthalate quick drying paint liquid and 10 grams of pine oil. A stiff paint resulted. After aging for one month, it had a mobility of 78 seconds on the Gardner mobilometer, using a 100 gram weight plunger.

In comparison, a test was made at the same time, using 200 grams of zinc oxide which had previously been pressed with 10 grams of pine oil at 22,000 pounds per square inch. This cake of 210 grams was ground in 400 grams of glycerin phthalate paint liquid. At the end of one month the composition was still very liquid and the mobility of this mixture was only 22 seconds on the Gardner mobilometer with the same weight plunger.

The complete filming of the pigment particles with the wetting agent, under the influence of great pressure, will be seen to have prevented reaction between the pigment and the resinous liquid whereby desirable fluidity of the composition resulted.

Experiment 2

400 grams of zinc oxide was ground with 200 grams of linseed oil and 20 grams of pine oil. After aging one month, the paste was so thick that an 1100 grams weight was required on the Gardner mobilometer plunger to descend 10 cm. in 30 seconds. At the same time, an experiment was made by pressing 400 grams of zinc oxide with 20 grams of pine oil at a pressure of 22,000 pounds per square inch. This cake of 420 grams was ground with 200 grams of linseed oil. After aging for one month this required only a 100 gram weight to descend 10 cm. in 74 seconds. The product was very fluid. In this case a film of pine oil had been pressed around the particles of zinc oxide in a very efficient manner, thus entirely protecting them from reaction with the soap forming acids of the linseed oil. Such a result was not accomplished by mere mixing of the pigment with pine oil, but required the tremendous pressure exerted to displace the air around the particles of pigment and allow the pine oil to thoroughly wet them.

Experiment 3

100 grams of carbon black was sprayed with 15 grams of sulphur-turpentine, a reaction product containing about 5% by weight of sulphur in combined form and being a reddish-brown viscous liquid having an accelerating effect in the vulcanization of rubber (said product being the subject matter of invention described and claimed in application Serial No. 578,610, filed December 2, 1931, in the names of Henry A. Gardner and Leland P. Hart). The mass was then submitted to a pressure of 22,000 pounds per square inch, the volume of the product being reduced to about 25% of its original volume. This dense cake of carbon black was then used in compounding a batch of rubber on the following formula,

| | Grams |
|---|---|
| Rubber | 300 |
| Pressed carbon black-sulphur-turpentine cake | 135 |
| Zinc oxide | 15 |
| Captax accelerator | 2.4 |
| Sulphur | 9.0 |

This batch was labelled A. At the same time batch B was made up on identically the same formula but using 120 grams of the same carbon black which had not been treated with sulphur-turpentine and which was not pressed. Batch A mixed in very readily, without dusting, whereas batch B was incorporated with more difficulty and raised a dense dust in the workroom. The batches were cured at 15, 30, 45 and 90 minutes. It was found that the tensile strength and elongation of batch A was approximately 10% greater than that of batch B. For instance, at 30 minutes cure, batch A had a tensile strength of 2530 pounds as against 2270 pounds for batch B. At a cure of 90 minutes, the tensile strength of batch A was 1795 pounds as against 1700 pounds for batch B. The ultimate elongation at 30 minutes was 570 for batch A, as against 550 for batch B, and at 90 minutes 490 for batch A as against 470 for batch B.

It is apparent, therefore, that the particles of carbon black pressed under this great pressure in the presence of the sulphur-turpentine reaction product readily gave up the gases surrounding the particles, and allowed the particles to become thoroughly wetted by the sulphur-turpentine reaction product. This made possible easy dispersion in the rubber. Moreover, the great advantages of low bulk in adding the pigment in this manner and of easy incorporation without dusting are worthy of note.

I have also experimented with many other wetting liquids, including linseed oil, for these pigments.

Experiment 4

It is customary to mix about 2 pounds of aluminum powder in a gallon of varnish to make an aluminum coating. In doing so, the powder, because of its light, fluffy nature, dusts all over the room in which it is being mixed. If mixed on the job out of doors, it flies in every direction. By pressing about 80 pounds of aluminum powder with 20 pounds of pine oil, in the manner set out in the foregoing experiment, reducing the volume of the powder to a very remarkable extent, as it normally is extremely bulky, the dusting was obviated. The solid cake thus formed, the particles of which were all thoroughly wetted with pine oil, was then dispersed readily in a small amount of varnish by thorough agitation and additional varnish added to make the aluminum paint. These cakes of coated aluminum powder in pressed form take up about one-fourth the space of the bulk aluminum powder.

Experiment 5

In industries, red lead in dry form is often purchased and mixed by hand with linseed oil. This is rather hazardous, as the red lead flies around in powder form and might become absorbed through the mouth. 95 pounds of red lead and 5 pounds of pine oil were mixed together and pressed into a cake under 22,000 pounds pressure. 100 grams of this cake were then dispersed in from 15 to 20 grams of linseed oil most readily, to produce a paint of excellent physical properties.

After standing two days, the mobility of the paint was 8.5 seconds on the Gardner molibometer, whereas a paint of the same composition made from ordinary dry powdered red lead had a mobility of 18.8 seconds.

The added advantage of this process is that the cake may be used with some varnish liquids without danger of hardening, whereas ordinary dry red lead, when thus used, will react within a few hours to produce a thickened, hard mass which in a few days is unusable. In other words, dry red lead reacts rapidly with acid varnishes, whereas red lead treated by my process shows but little reaction under similar circumstances.

Experiment 6

Pigments which are precipitated on barium sulphate, such as "Titanox", a pigment consisting of approximately 30% $TiO_2$ precipitated on 70% barium sulphate, are sometimes difficult to wet with linseed oil and they may, therefore, when made into paints, show a somewhat dry condition when they settle at the bottom of the paint container. This is overcome by the following procedure:

5 pounds of fatty acids from linseed oil were dissolved in 95 pounds of kerosene. 5 pounds of this mixture were then spread upon 95 pounds of "Titanox", and the mass was subjected to a pressure of 22,000 pounds to form cakes. The particles of the "Titanox" were thus thoroughly wetted with an easy wetting substance. When this pigment cake was dispersed into linseed oil it produced a paint which showed easy dispersion and non-settling properties.

Experiment 7

Insecticides such as Paris green or calcium arsenate constitute, of course, a dust hazard. To overcome this, I treated 100 pounds of calcium arsenate with 5 pounds of glycerin, and then pressed it, at 20,000 pounds per square inch. The resulting cakes dispersed readily in water. The product thus obtained may be used to treat vegetation, and the dust hazard overcome by this method.

It will, of course, be appreciated that the degree of pressure recited in the foregoing examples is not critical, but that a reasonable variation therefrom is within the scope and intent of the present invention, it being the object to exert such a pressure upon the pigment and wetting agent as to effect displacement of gas film about the surfaces of the pigment particles with wetting agent.

It is to be understood that by the expressions "pigment wetting agent" and "wetting agent for the pigment", as the same are here used, is meant a liquid, liquefiable, or water-soluble, organic substance having the property, when intimately associated with pigment, of aiding in the incorporation of the pigment into a non-aqueous vehicle such for instance as oil, solutions of resins and/or gums, rubber, other plastics, and the like.

I claim:

1. The method of improving the characteristics of a pigment by commingling with the pigment in substantially dry form a relatively small amount of an oily organic pigment-wetting agent and then expelling occluded gas from the product and consolidating the latter into a coherent mass by compressing it under a pressure of the order of ten tons per square inch, characterized in that the wetting agent is a sulphur-terpene reaction product.

2. Method of improving the characteristics of carbon black which consists in intimately associating with the carbon black about 5% by weight of a sulphur-terpene reaction product and thereafter expelling occluded gas from the product and consolidating the same into a coherent mass by compressing the mixture under a pressure of the order of ten tons per square inch.

3. As an article of manufacture a coherent compressed mass composed of pigment particles and a relatively small amount of an oily organic wetting agent for the pigment, the pigment particles showing substantially no evidence of gas film on their surfaces and being individually filmed with the said wetting agent, in which the wetting agent is a sulphur-terpene reaction product.

4. As an article of manufacture, a coherent compressed mass consisting of about 95% by weight of carbon black particles and about 5% by weight of a sulphur-terpene reaction product, the latter being present in the mass as film directly adhering to the surfaces of the individual particles of the carbon black.

HENRY A. GARDNER.